US010500955B2

(12) United States Patent
Mere et al.

(10) Patent No.: US 10,500,955 B2
(45) Date of Patent: Dec. 10, 2019

(54) AUTOMATIC UPGRADE OF A VEHICLE-BASED PROCESSOR BASED ON A PHYSICAL COMPONENT CHANGE

(71) Applicant: Visteon Global Technologies, Inc., Van Buren Township, MI (US)

(72) Inventors: Shadi Mere, Ann Arbor, MI (US); Theodore Charles Wingrove, Plymouth, MI (US); Michael Eichbrecht, Farmington Hills, MI (US); Kyle Entsminger, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/957,190

(22) Filed: Dec. 2, 2015

(65) Prior Publication Data

US 2016/0185221 A1    Jun. 30, 2016

Related U.S. Application Data

(60) Provisional application No. 62/098,041, filed on Dec. 30, 2014.

(51) Int. Cl.
*B60K 35/00* (2006.01)
*G06F 8/65* (2018.01)
(Continued)

(52) U.S. Cl.
CPC .............. *B60K 35/00* (2013.01); *B60K 37/04* (2013.01); *G06F 8/65* (2013.01); *G06F 8/654* (2018.02); *B60K 2370/828* (2019.05)

(58) Field of Classification Search
CPC .......................... G06F 8/65–665; B60K 35/00
(Continued)

(56) References Cited

U.S. PATENT DOCUMENTS 6,370,449 B1    4/2002   Razavi et al.
6,838,852 B1 *  1/2005   Namuduri .......... G05B 19/0423
                                                        318/434
(Continued)

FOREIGN PATENT DOCUMENTS

JP       2000333272 A     11/2000
JP       2001243053 A      9/2001
(Continued)

OTHER PUBLICATIONS

"An Ontology-based Plug-and-Play Approach for In-Vehicle Time-Sensitive Networking (TSN)"—Morteza Hashemi Farzaneh and Alois Knoll; Robotics and Embedded Systems, Technische Universitat Munchen—2016 IEEE.*

*Primary Examiner* — Francisco J Aponte
(74) *Attorney, Agent, or Firm* — Dickinson Wright PLLC

(57) ABSTRACT

The aspects of the present disclosure provide an upgradable vehicle cockpit interface and in particular, to a single or multi-phase upgradable hardware and firmware vehicle cockpit interface. The upgradable vehicle cockpit interface may include one or more hardware and firmware components that may be designed to interface with or connect to one or more corresponding hardware and firmware blocks located within the vehicle cockpit. The hardware and firmware components may be detachable from the hardware and firmware blocks and may be backwards compatible with the vehicle's hardware and firmware blocks. The upgradable vehicle cockpit interface enables an individual to experience the same vehicle over a time period and have the ability to upgrade the vehicle components (i.e. electronics) to ease the vehicle aging process.

18 Claims, 7 Drawing Sheets

(51) Int. Cl.
G06F 8/654 (2018.01)
B60K 37/04 (2006.01)

(58) Field of Classification Search
USPC .......................................................... 717/168
See application file for complete search history.

(56) References Cited

U.S. PATENT DOCUMENTS

| | | | | |
|---|---|---|---|---|
| 6,873,886 B1* | 3/2005 | Mullen | ............... | B64G 1/24 701/2 |
| 7,415,332 B2* | 8/2008 | Ito | ............... | B60R 25/00 307/10.1 |
| 8,116,205 B2* | 2/2012 | Reinold | ............... | H04L 45/00 370/235 |
| 8,694,982 B2* | 4/2014 | Wempen | ............... | G06F 8/65 717/168 |
| 8,856,479 B2* | 10/2014 | Gerhard | ............... | G06F 9/3857 711/150 |
| 9,020,697 B2* | 4/2015 | Ricci | ............... | H04W 4/21 701/36 |
| 9,043,016 B2* | 5/2015 | Filippov | ............... | B60T 7/22 700/245 |
| 9,443,358 B2* | 9/2016 | Breed | ............... | G06F 8/65 |
| 10,035,516 B2* | 7/2018 | Sinaguinan | ............... | B60W 50/0098 |
| 2004/0148073 A1* | 7/2004 | Hawig | ............... | B60R 25/00 701/36 |
| 2005/0177287 A1* | 8/2005 | Wang | ............... | B60K 37/06 701/36 |
| 2007/0057781 A1* | 3/2007 | Breed | ............... | B60K 35/00 340/457.1 |
| 2008/0140278 A1* | 6/2008 | Breed | ............... | G06F 8/65 701/31.4 |
| 2009/0132118 A1* | 5/2009 | Takeda | ............... | H04L 12/40013 701/36 |
| 2010/0097178 A1* | 4/2010 | Pisz | ............... | B60R 16/037 340/5.72 |
| 2010/0228404 A1* | 9/2010 | Link, II | ............... | G06F 9/44542 701/1 |
| 2011/0093190 A1* | 4/2011 | Yoon | ............... | G01C 21/365 701/533 |
| 2011/0197187 A1* | 8/2011 | Roh | ............... | G06F 8/65 717/173 |
| 2012/0053754 A1* | 3/2012 | Pease | ............... | B60R 16/023 701/1 |
| 2012/0260164 A1* | 10/2012 | Scheufler | ............... | B60K 35/00 715/702 |
| 2013/0020991 A1* | 1/2013 | DeBoer | ............... | B60L 11/1838 320/109 |
| 2013/0145482 A1* | 6/2013 | Ricci | ............... | H04W 4/90 726/28 |
| 2013/0200991 A1* | 8/2013 | Ricci | ............... | G08C 19/00 340/4.3 |
| 2013/0204493 A1* | 8/2013 | Ricci | ............... | G06F 17/00 701/41 |
| 2013/0245857 A1* | 9/2013 | Gariepy | ............... | G05B 19/0428 701/2 |
| 2014/0109075 A1* | 4/2014 | Hoffman | ............... | G06F 8/65 717/169 |
| 2014/0109080 A1* | 4/2014 | Ricci | ............... | G06F 8/61 717/174 |
| 2014/0143839 A1* | 5/2014 | Ricci | ............... | H04W 12/06 726/4 |
| 2014/0276090 A1* | 9/2014 | Breed | ............... | A61B 5/18 600/473 |
| 2014/0303807 A1* | 10/2014 | Addepalli | ............... | H04W 4/046 701/1 |
| 2014/0303839 A1* | 10/2014 | Filev | ............... | G06F 3/0481 701/36 |
| 2014/0325419 A1* | 10/2014 | Andersen | ............... | B60K 37/06 715/771 |
| 2014/0358362 A1* | 12/2014 | Breed | ............... | G06F 8/65 701/31.9 |
| 2015/0039877 A1* | 2/2015 | Hall | ............... | G06F 1/32 713/2 |
| 2015/0052447 A1* | 2/2015 | Ritesh | ............... | H04L 67/125 715/740 |
| 2015/0242198 A1* | 8/2015 | Tobolski | ............... | G06F 8/61 717/172 |
| 2015/0301527 A1* | 10/2015 | Erickson | ............... | B63H 21/21 701/2 |
| 2015/0363210 A1* | 12/2015 | Wehrman | ............... | G06F 8/65 701/31.5 |
| 2016/0188315 A1* | 6/2016 | Mere | ............... | G06F 8/665 717/170 |
| 2017/0064617 A1* | 3/2017 | Buttolo | ............... | B60R 16/037 |
| 2017/0080949 A1* | 3/2017 | Sinaguinan | ............... | B60W 50/0098 |
| 2017/0197631 A1* | 7/2017 | Sinaguinan | ............... | B60W 50/0098 |

FOREIGN PATENT DOCUMENTS

| | | |
|---|---|---|
| JP | 2002187506 A | 7/2002 |
| JP | 2008185520 A | 8/2008 |
| JP | 2010218070 A | 9/2010 |
| JP | 2012048611 A | 3/2012 |
| JP | 2013514237 A | 4/2013 |
| JP | 2013216245 A | 10/2013 |
| JP | 2014228927 A | 12/2014 |
| WO | 2014087523 A1 | 6/2014 |

* cited by examiner

AUTOMATIC UPGRADE OF A VEHICLE-BASED PROCESSOR BASED ON A PHYSICAL COMPONENT CHANGE

CROSS-REFERENCE TO RELATED APPLICATION

This patent application claims priority to U.S. Provisional Application No. 62/098,041, filed Dec. 30, 2014, entitled "UPGRADABLE VEHICLE COCKPIT INTERFACE,". This patent application contains the entire Detailed Description of U.S. Provisional Patent application No. 62/098,041.

BACKGROUND

Technology is growing at a rapid rate. As a result of this growth, there has been an increase of technology turnover. For instance, an individual may buy a smart device, and six months later the device becomes outdated because a newer model is released. The individual may desire to upgrade their device. Many individuals enjoy being at the forefront of technology.

In the automotive industry the newest technology may not be readily available to consumers. OEMs and suppliers design and vehicle electronics add-ons in advance of the vehicles production and sales. When an individual buys or leases a vehicle in 2012, the technology is from a prior time. Individuals also keep these vehicles for years after purchase. Thus, the vehicle electronics may be out of date. Fast forward two or more years and the vehicle electronics are at least four years old. In other words, the vehicle electronics are not up-to-date.

SUMMARY

A system for upgrading a component of a vehicle is described herein. The system includes an electronic control unit (ECU) having a non-volatile memory, the non-volatile memory being employed to store instructions on the operation of the component; and an upgradeable vehicle cockpit interface configured to load data onto the non-volatile memory component, wherein in response to the component being transitioned from a previous version of the component to another version of the component, the upgradeable vehicle cockpit interface rewrites the stored instructions to allow the ECU to interface with the other version of the component.

Another example of the system, the component is of a display type.

Another example of the system, the previous version of the component is a dashboard display.

Another example of the system, the other version of the component is a heads-up display (HUD).

Another example of the system, the previous version of the component is a heads-up display (HUD).

Another example of the system, the other version is a heads-up display (HUD).

Another example of the system, the component is a sensory control hardware device.

Another example of the system, the previous component and the other component is at least one of the following: gesture sensor, touch pad, haptic pad, button knob, and eye tracking device.

Another example of the system, a downloadable interface to connect to a mobile communication device is provided, wherein the downloadable interface is configured to instigate a communication with a third-party source to retrieve new instructions in response to the stored instructions not being available.

A method for providing an upgradeable vehicle is also provided. The method includes installing the upgradeable vehicle with multiple ports for implementing a component; implementing a microcontroller with instructions for operating an older version of the component and a newer version of the component; and in response to the newer version of the component being installed in the upgradeable vehicle, modifying the microcontroller to be operable with the instructions of the newer version of the component.

In another example of the method, the newer version of the component is heads-up display (HUD) and the older version is a dashboard display.

In another example of the method, either the newer version or the older version of the component is one of the following: gesture sensor; touch pad; haptic pad; button knob; and eye tracking device.

In another example of the method, in response to the instructions of the newer version of the component being not installed in the microcontroller, prompting a download from a third-party provider over a network.

An upgradeable vehicle is provided herein. The upgradeable vehicle includes a first installation portion of a first component and a second installation portion of a second component, wherein the first component and the second component represent an older version and a newer version of a function associated with the upgradeable vehicle, respectively; and a microcontroller with instructions for the first component and the second component, wherein in response to second component replacing the first component in the upgradeable vehicle, the microcontroller being configured to employ the instructions for the second component in an active manner.

In one example of the function is related to a display-able technology.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

The present disclosure relates to an upgradable vehicle cockpit interface and in particular, to a single or multi-phase upgradable hardware and firmware vehicle cockpit interface. The upgradable vehicle cockpit interface may include one or more hardware and firmware components and is designed to interface with or connect to one or more corresponding hardware and firmware blocks located within the vehicle cockpit. The hardware and firmware components may be detachable from the hardware and firmware blocks and may be backwards compatible with the vehicle's hardware and firmware blocks. The upgradable vehicle cockpit interface enables an individual to experience the same vehicle over a time period having the ability to upgrade the vehicle components to ease the vehicle aging process.

Figure 1:
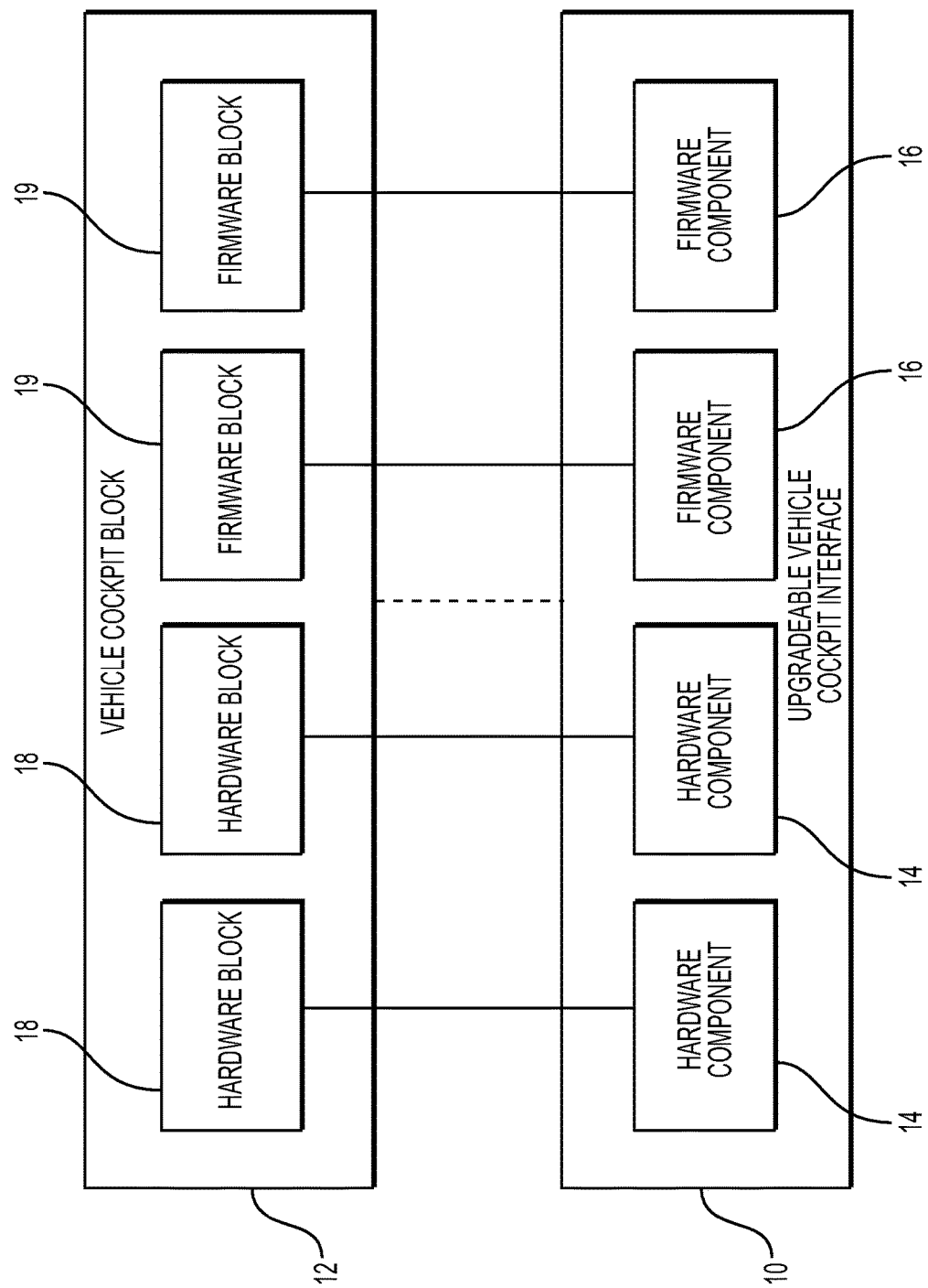
FIG. 1 is a block diagram of a first example of an upgradable vehicle cockpit interface in accordance with an aspect of the present disclosure.

Referring to FIG. 1, a block diagram of an example of an upgradable vehicle cockpit interface 10 in accordance with an aspect of the present disclosure is shown. The upgradable vehicle cockpit interface 10 is configured to interface with a vehicle cockpit block 12 and is designed to be adjustable and updatable.

A vehicle cockpit may include all components and vehicle add-on electronics within the interior of the vehicle. The vehicle cockpit may be visible to the driver and passenger. A vehicle cockpit block 12 may be disposed within the vehicle cockpit and may contain or house the components within the vehicle. The vehicle cockpit block 12 may have one or more fasteners for attachment with the components. The upgradable vehicle cockpit interface 10 may include one or more hardware components 14 and one or more firmware components 16. FIG. 1 shows two hardware components 14 and two firmware components 16, the number of hardware and firmware components is merely exemplary. The hardware components 14 may be configured to interface with the vehicle cockpit block 12 through one or more corresponding hardware blocks 18. The hardware blocks 18 may be a hardware module configured to receive the actual hardware component 14. The hardware blocks 18 may also include wiring or buses that connect the hardware components 14 to the vehicle, to an electronic control unit, and to other hardware components 14. The hardware component 14 may be connected to the hardware blocks 18 through a mounting plate (not shown) or through one or more fasteners, such as, hooks, tabs, snaps, grooves, or the like. According to another aspect, the hardware component 14 may interface with the hardware blocks 18 through one or more connectors (not shown), including male or female connectors. The hardware components 14 are further connected to the hardware blocks 18. Similarly, the firmware components 16 are configured to interface with the vehicle cockpit block 12 through the one or more corresponding firmware blocks 19. The firmware block 19 may be port or driver. The firmware components 16 may include firmware inserts configured to be received by the firmware block 19. The firmware components 16 may also be configured to upload content or a set of instructions for performing a task automatically to the firmware block 19 in response to the current hardware configuration. In other words, the firmware components 16 are backwards compatible and will upload a set of instructions that the current hardware can operate. For example, the firmware component 16 will upload applications to the vehicle cockpit block 12 that the hardware component 14 and block 18 can support. The hardware 14 and firmware components 16 may be removable and changeable to allow updated other hardware and firmware components to interface with the vehicle cockpit block 12. The hardware 14 and firmware components 15 may also be in communication with one another.

In operation, the upgradable vehicle cockpit interface 10 may be configured to a preinstalled interface (not shown) connected to the vehicle cockpit block 12. The preinstalled interface may be the vehicle interface originally installed by the vehicle's manufacturer or may be dealer installed. The upgradable vehicle cockpit interface 10 may replace the preinstalled interface after a time period in response to an advance or change in technology. Additionally, the upgradable vehicle cockpit interface 10 may be designed to allow future changes or installations of other components to upgrade or update the system through hardware or firmware components or various connectors.

Figure 2:
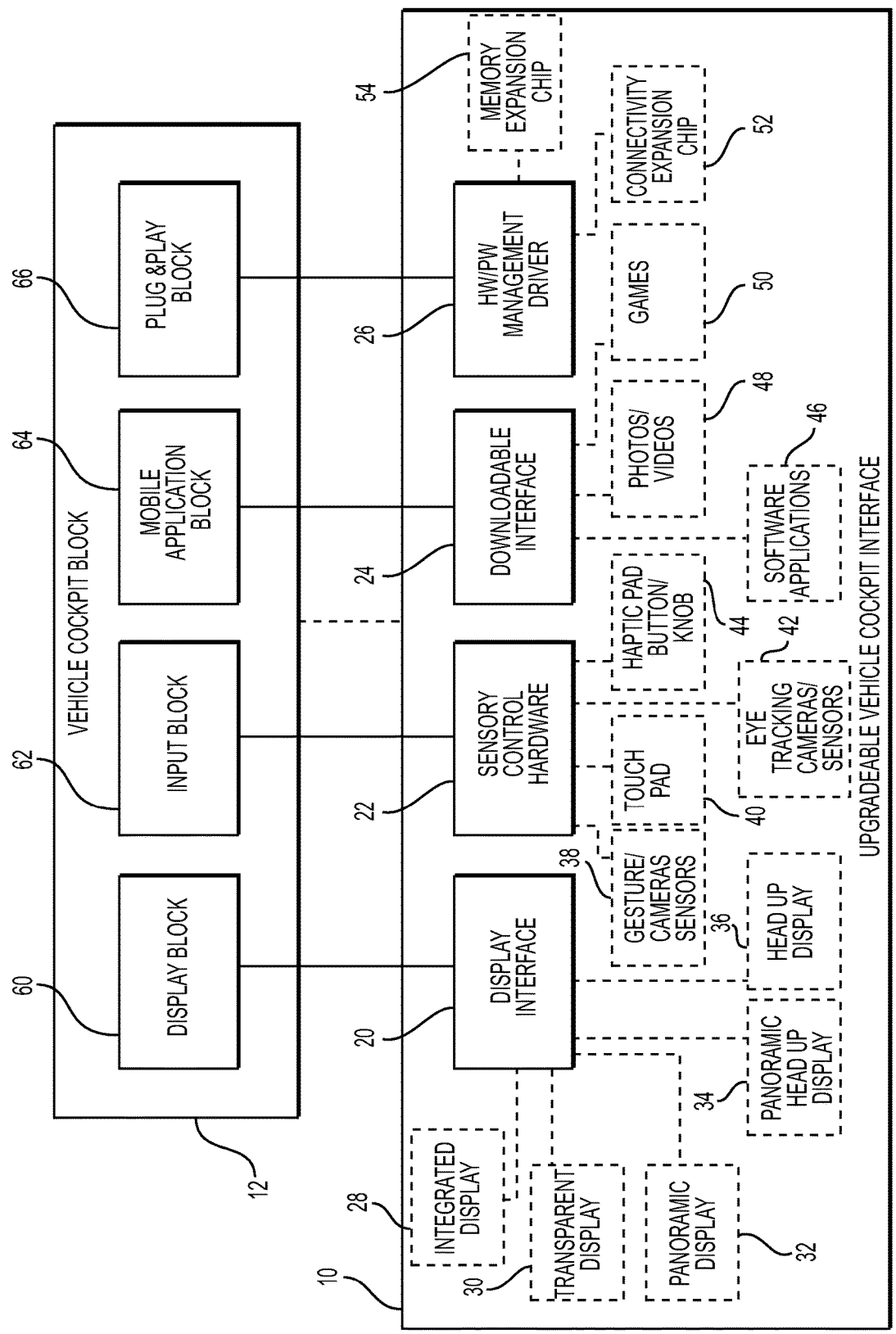
FIG. 2 is a block diagram of a second example of an upgradable vehicle cockpit interface in accordance with an aspect of the present disclosure.

FIG. 2 is a block diagram of a second example of an upgradable vehicle cockpit interface in accordance with an aspect of the present disclosure. In particular, FIG. 2 shows FIG. 1 in further detail. As shown in FIG. 1, the upgrade vehicle cockpit interface 10 may include one or more hardware components 14 such as, a display interface 20, sensory control hardware 22, and one or more firmware components 16. The firmware components 16 may be a downloadable interface 24 and a hardware/firmware management driver 26.

The display interface 20 may be configured to include one or more of an integrated display 28, a transparent display 30, a panoramic display 32, a panoramic "heads-up" display 34, and a "heads-up" display 36. The display interface 20 may be removable and may replace a display (not shown) originally disposed on the vehicle cockpit block 12. For instance, if an integrated display 28 is originally placed into the vehicle cockpit block 12, then a transparent display 30 may replace the integrated display 28 after a time period in response to an advance or change in technology. The display interface 20 may be further configured to display content, such as, video, photos, music, temperature settings, and the like. The display interface 20 may interface with the vehicle cockpit's display block 60. The display block 60 may include connectors or fasteners for attach the display interface 20 to the vehicle cockpit block 12. The display block 60 may also be connected to other hardware blocks and the vehicle's electronic control unit.

The sensory control hardware 22 may be configured to include a camera/sensor 38, touch pad 40, eye tracking camera/sensor 42, and haptic pad/button/knob 44. The sensory control hardware 22 may be removable and replace control hardware (not shown) originally installed on the vehicle cockpit block 12. The sensory control hardware 22 may be designed to provide an input to control components in the vehicle. The sensory control hardware 22 is configured to connect to the vehicle cockpit's input block 62. The input block 62 may have one or more fasteners for attachment with the sensory control hardware 22. The input block 62 may be configured to connect the sensory control hardware 22 to other components or to the vehicle's electronic control unit.

The downloadable interface 24 may be configured to include, but is not limited to, one or more sets of instructions that performs a task programs designed update mobile applications 46, photo/videos 48, and games 52. The downloadable interface 24 may be configured to be installed on the vehicle cockpit's mobile application block 64. The mobile application block 64 may include a port for receiving the downloadable interface 24. The mobile application block 64 may also be attached to the vehicle's electronic control unit or processor. Further, the downloadable interface 24 may be configured to interact with one or more hardware components, described previously. The downloadable interface 24 may be designed to automatically upload content to the vehicle cockpit's mobile application block 64 based on the current hardware configuration. In another aspect, the downloadable interface 24 may wirelessly upload content in response to being inserted into the mobile application block 24. The downloadable interface 24 may be any firmware medium designed to transfer a set of instructions that perform a task. For example, the downloadable interface 24 may be a USB device, a chip, or a device configured to upload the set of instructions that perform a task to the firmware block 64 wirelessly through Bluetooth, WI-FI, cellular network, or any wireless transmission network.

The HW/FW management driver 26 may be configured to include one or more memory expansion chips 54, connectivity expansion chips 52, or another type of chip that changes the performance of the vehicle cockpit block 12. The HW/FW management driver 26 may be inserted into the plug & play block 66. The plug & play block 66 may be a port and may be connected to other hardware components. The plug & play block 66 may further be connected to the vehicle's electronic control unit or a processor. The HW/FW management driver 26 upgrades the performance or operation of the vehicle cockpit block 12.

In operation, the upgradable vehicle cockpit interface 10 may be configured with a preinstalled interface (not shown) connected to the vehicle cockpit block 12. The preinstalled interface may be the vehicle interface originally installed by the vehicle's manufacturer or may be dealer installed. The upgradable vehicle cockpit interface 10 may replace the preinstalled interface, for example, in response to an advance or change in technology. The display interface 20, sensory control interface 22, downloadable interface 24, and HW/FW management driver 26 may be connected with one another.

The upgradable vehicle interface 10 may be designed to be a single phase upgrade or may facilitate multi-phase upgrading. In other words, the interface 10 may replace the preinstalled interface once with all hardware and firmware components packaged together or may replace the preinstalled interface over time with separate packages of various hardware and firmware components. The upgradable vehicle interface 10 may also update a previously upgraded interface.

Figure 3:
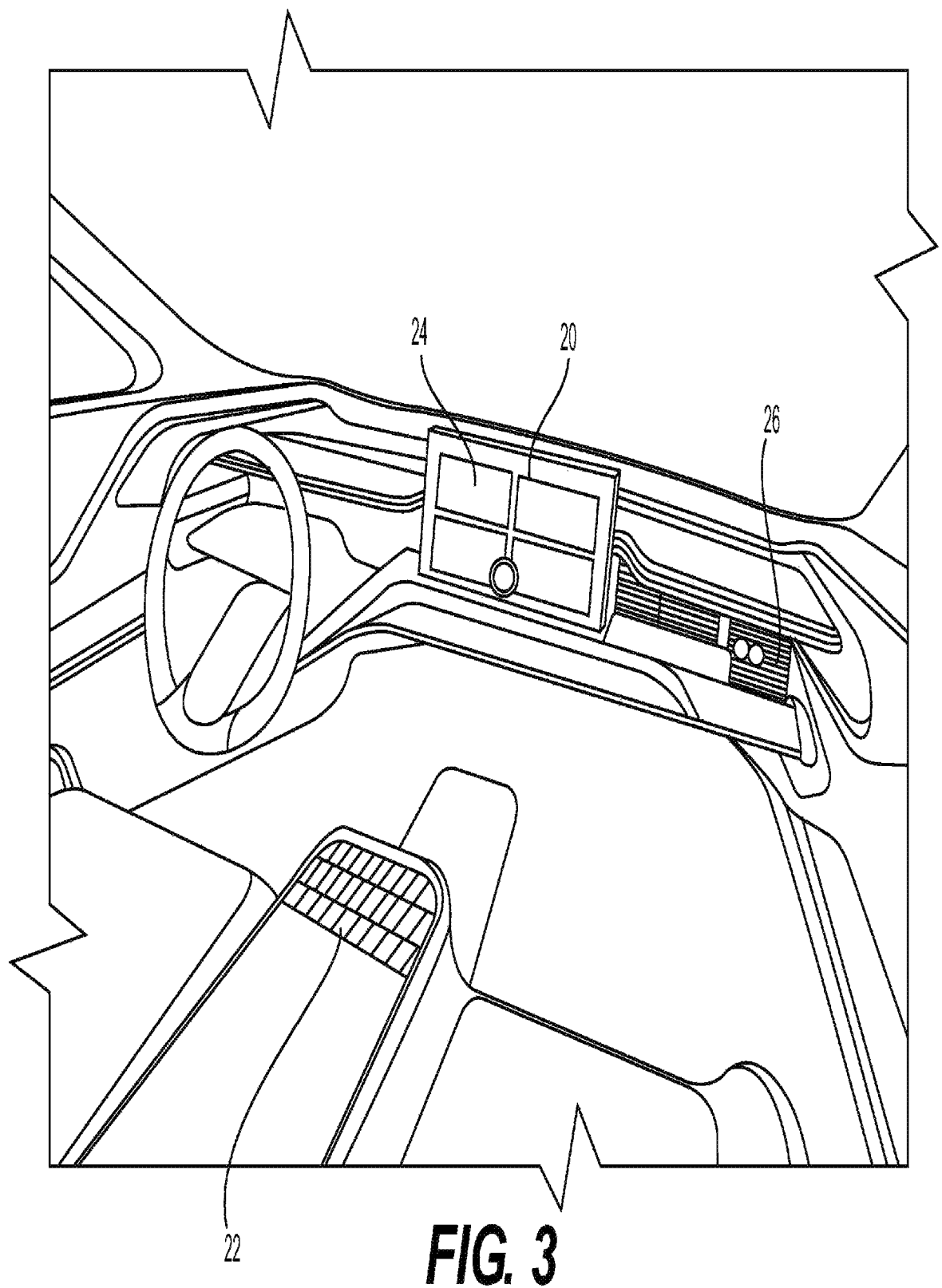
FIG. 3 is an illustration of an example of an upgradable vehicle cockpit interface in accordance with an aspect of the present disclosure.

FIG. 3 shows an illustration of an example of an upgradable vehicle cockpit interface 10 in accordance with an aspect of the present disclosure. In particular, an upgradable vehicle cockpit interface 10 is shown within the vehicle cockpit and is interconnected with the vehicle cockpit block 12, described in FIGS. 1 and 2. The vehicle cockpit interface 10 may include one or more upgradable displays and "heads-up" displays 20. The upgradable displays and "heads-up" displays 20 may be configured to display various media content.

The upgradable vehicle cockpit interface 10 may also include a downloadable interface 24. The downloadable interface 24 may include content that automatically updates current content based on a hardware configuration present in the vehicle cockpit. The downloadable interface 24 may interact with one or more hardware components, for example, the display interface 20.

The upgradable vehicle cockpit interface 10 may further include sensory control hardware 22 such as the touch pad. The upgradable vehicle cockpit interface 10 may include a HW/FW management driver 26 such as a memory expansion device, as shown in FIG. 3. An aspect of the sensory control hardware 22 may be designed to be removable or detachable and may be configured to provide an input to control hardware and firmware of the upgradable vehicle cockpit interface 10 and the vehicle cockpit. For example, the sensory control hardware 22 may include a gesture control interface (not shown) configured to add to or replace the touch pad after a time period. With respect to the HW/FW management driver 26, a chip or device configured to update or improve the vehicle cockpit's performance or operation after a time period may be provided. The chip or device may expand the cockpit's memory storage or improve connectivity of hardware, firmware, internet based services, or a combination thereof. Other controls such as HVAC units or radio stereo may not be designed to be upgradable.

As discussed above, the upgradable vehicle cockpit interface's 10 hardware components may be detachable from the vehicle cockpit block 12 and the firmware components may be installable or un-installable in response to a change or advancement to the component's function or technology. The display interface 20, sensory control hardware 22, downloadable interface 24, and HW/FW management driver 26 may form one example of an upgradable vehicle cockpit interface 10, and may be prepackaged for vehicle installation.

Figure 4:
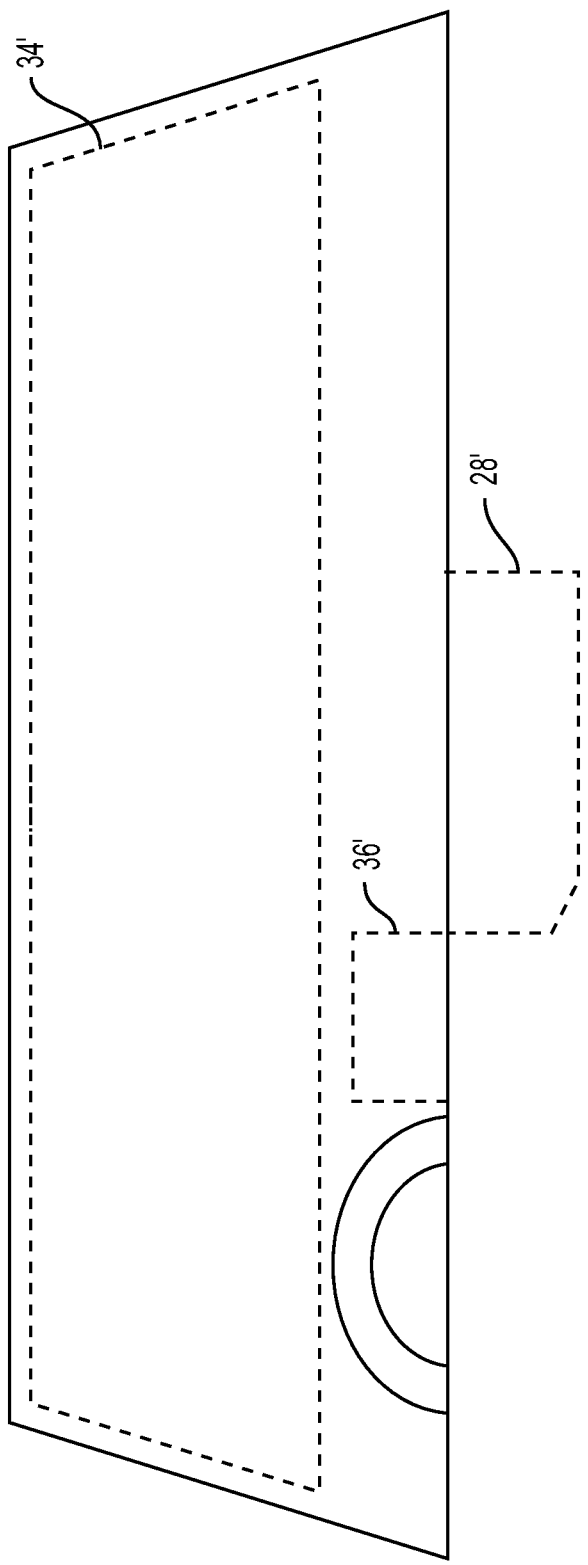
FIG. 4 illustrates a high-level depiction of an upgradeable vehicle according to an example implementation of the aspects disclosed herein.

FIG. 4 illustrates a high-level depiction of an upgradeable vehicle according to an example implementation of the aspects disclosed herein. The upgradeable vehicle includes multiple ports for installing various versions of a displayable technology. The display-able technology, as explained above, provides various information associated with the operation, entertainment, and other functions associated with the upgradeable vehicle.

Referring to FIG. 4, the upgradeable vehicle includes the following ports, a panoramic display port 34', a heads-up display port 36', and a dashboard display portion 28'. Thus, as the owner, implementer, or controller of the upgradeable vehicle switches from a display component associated with each of the ports, employing the aspects disclosed herein (for example, interface 10), the upgradeable vehicle automatically operates to be compliant with the newly installed display component.

The example in FIG. 4 shows how the concepts in this disclosure may be implemented with a display component. As explained, various other componentry enumerated in this disclosure may also be implemented with an upgradeable vehicle.

Figure 5C:
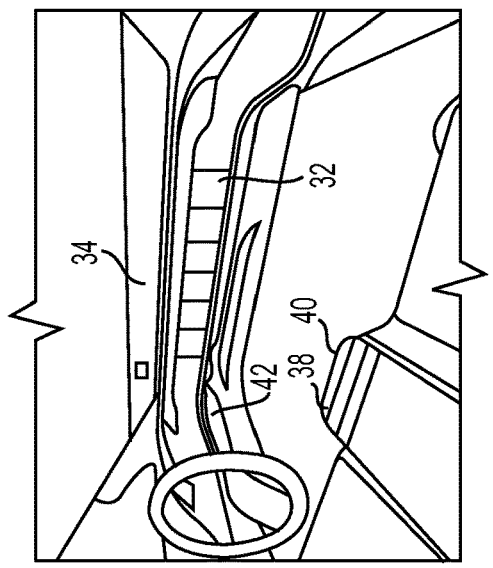
FIGS. 5A, B, and C are illustrations of an example of a 3-phase upgradable vehicle cockpit interface in accordance with an aspect of the present disclosure.
Figure 5B:
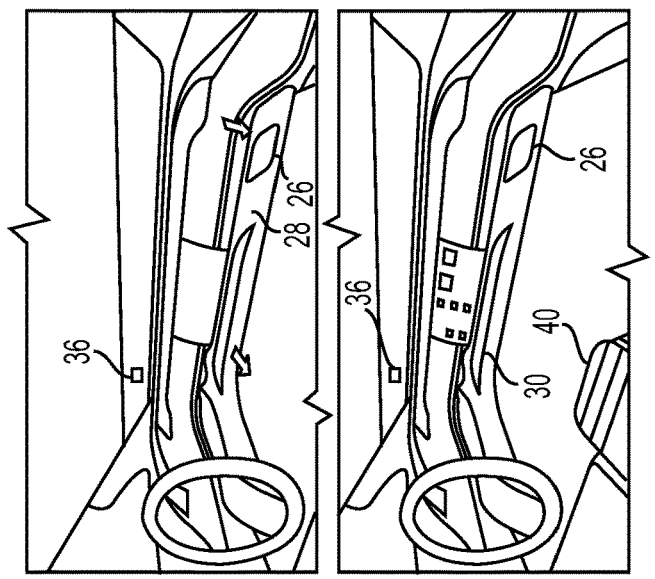
Figure 5A:
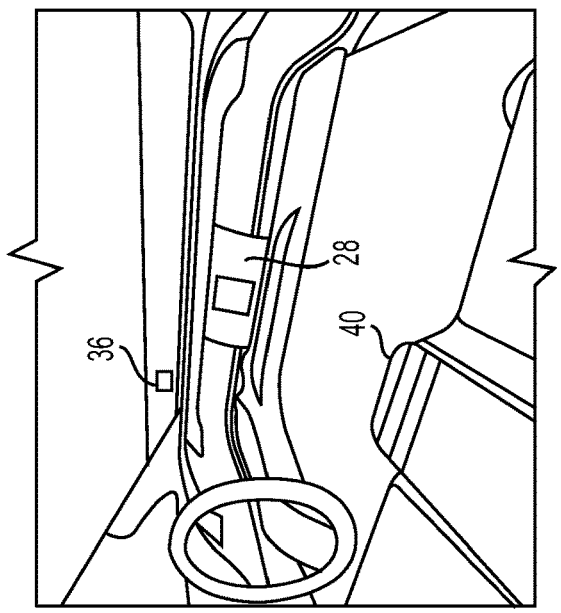

FIGS. 5A, B, and C, illustrate an example of a 3-phase upgradable vehicle cockpit interface 10 in accordance with an aspect of the present disclosure. Specifically, FIGS. 5A, B, and C show three configurations of the vehicle cockpit interface 10. FIG. 5A shows "phase one" of a vehicle cockpit with an integrated display 28, touch pad 40, "heads-up" display 26, and firmware application that may come pre-installed in the vehicle by a manufacturer or through dealer installation. "Phase One" of the vehicle cockpit does not include any connectors or fastener along the components or vehicle block to facilitate removal or replacement. After a time period, "phase two" of the upgradable vehicle cockpit interface 10 may be implement and installed, as shown in FIG. 5B.

FIG. 5B shows the upgradable vehicle cockpit interface 10 components being removed or detached from the vehicle cockpit block 12. Specifically, the integrated display 28 is removed and replaced with a transparent display 30 and with the downloadable interface 24. "Phase two" enables the user replacing the hardware and firmware components to easy remove and replace the components. The hardware blocks may include fasteners or connectors that allow for the hardware components to attach easily to the hardware blocks. The hardware components may also include corresponding connectors and fasteners to facilitate attachment. The downloadable interface 24 may update firmware automatically based on the vehicle components configuration. Phase two may also include adding the HW/FW management driver 26 to improve the performance or operation of the upgradable vehicle cockpit interface 10. In FIG. 5B, the "heads-up" display 23 and touch pad 40 were not upgraded.

FIG. 5C shows "phase three" of an upgradable vehicle cockpit interface 10. In phase three, the transparent display 30 is removed and a panoramic display 34 is inserted and interfaces with the vehicle cockpit block 12. The "heads-up" display 36 may also be replaced by the panoramic "heads-up" display 34. A gesture camera/sensor 38 and eye tracking camera/sensor 42 may also be added to the vehicle cockpit block 12 to provide other types of inputs for controlling the hardware components 14 within the vehicle cockpit.

In operation, the upgradable vehicle cockpit interface 10 may be configured to a preinstalled interface (not shown) connected to the vehicle cockpit block 12. The preinstalled interface may be the vehicle interface originally installed by the vehicle's manufacturer or may be dealer installed. Alternatively, the preinstalled interface may be a previous upgraded installed by the user or through dealer installation. The upgradable vehicle cockpit interface 10 may replace the preinstalled interface after a time period in response to an advance or change in technology.

The upgradable vehicle interface 10 may be designed to be a single phase upgrade or may facilitate multi-phase upgrading, as shown in FIGS. 5A, B, and C. In other words, the interface 10 may replace the preinstalled interface once with all hardware and firmware components packaged together or may replace the preinstalled interface over time with separate packages of various hardware and firmware components. The upgradable vehicle interface 10 may also be available to update past upgraded interfaces. Further, the upgradable vehicle interface 10 may come prepackaged as a unit.

Figure 6:
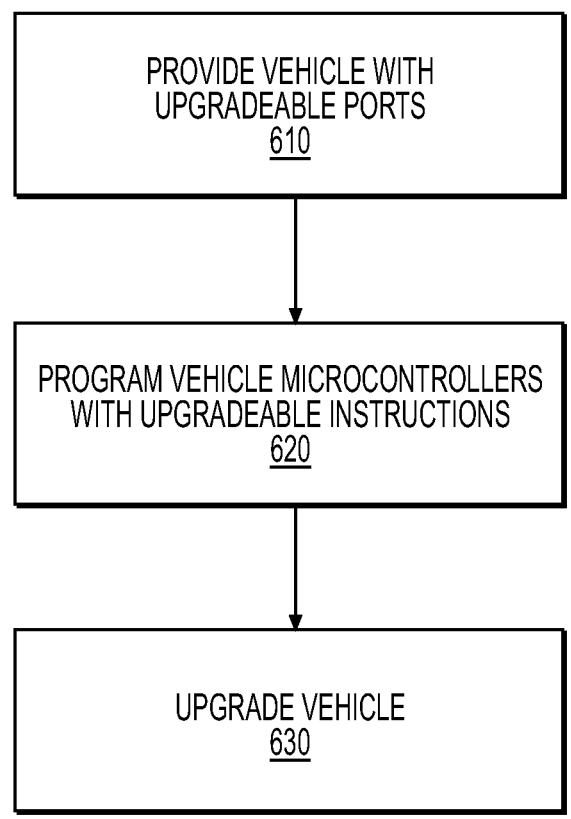
FIG. 6 illustrates an example method for providing an upgradeable vehicle according to the aspects disclosed herein.

FIG. 6 illustrates an example method 600 for providing an upgradeable vehicle according to the aspects disclosed herein. Employing method 600, a vehicle may be upgradeable according the examples explained above.

In operation 610, the vehicle is provided with upgradable ports. The upgradeable ports may be associated with various function commonly employed and used is a vehicle. For example, on such function may be display device used in the vehicle. Other examples may be an interface device, a temperature control system, a location selector, and the like.

In operation 620 (which may occur before operation 610), a microcontroller (or ECU) associated with the control of the vehicle or the function associated with the upgradeable portions in operation 610, is provided with multiple sets of instructions. The instructions are each configured to allow the vehicle to work with different components installed in any of the upgradeable ports (for example, as shown in FIG. 4, the various ports installed to allow different versions of display technologies to be installed).

Figure 7:
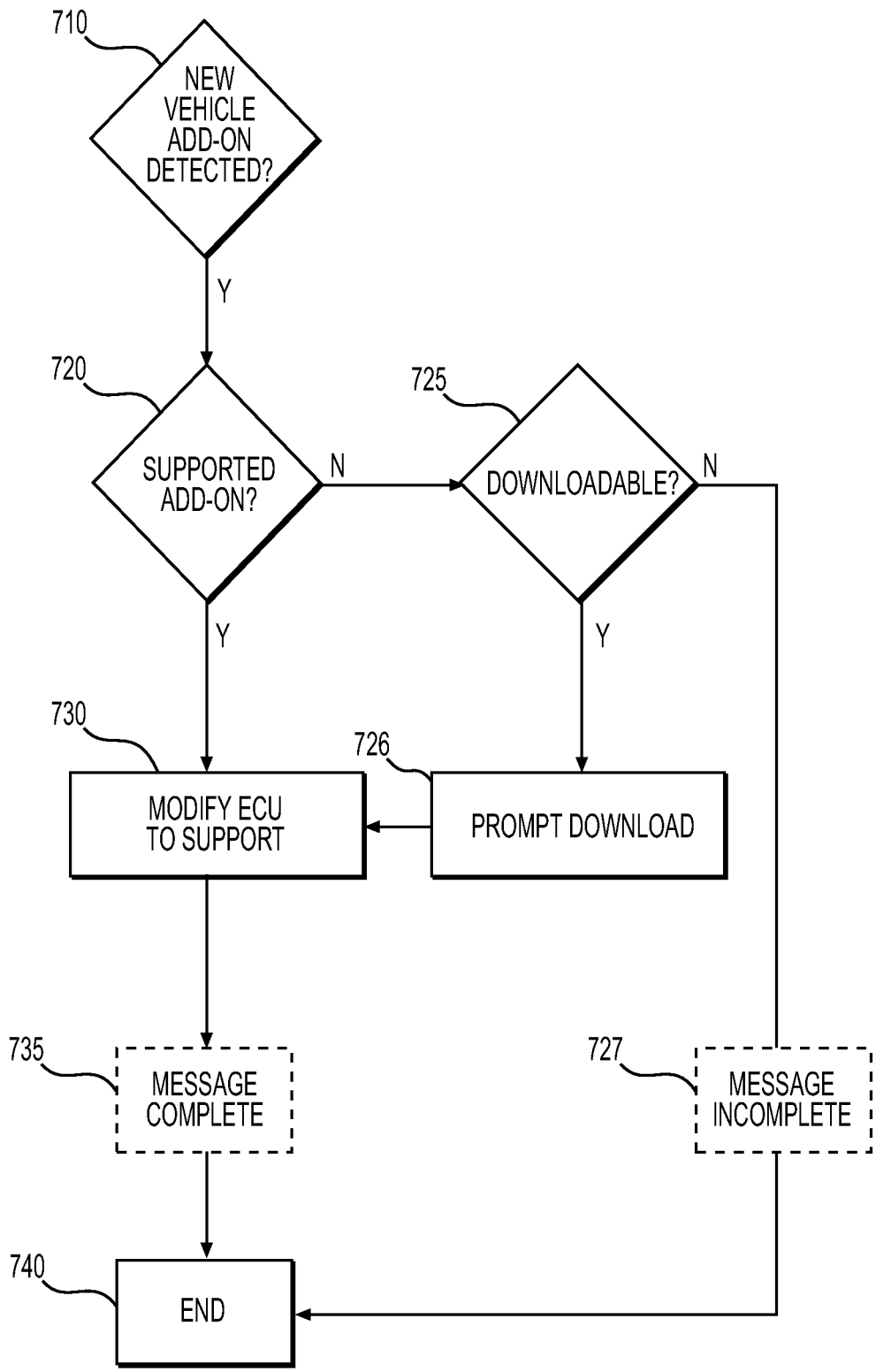
FIG. 7 illustrates a method for implementing the process of installing a newer version of the component.

In operation 630, when the vehicle is upgraded, the microcontroller is modified so that the active component being controlled is the newly installed component. For example, the microcontroller (or ECU) is re-configured so that the component being controlled is the new version of the component. FIG. 7 illustrates a method 700 for implementing the process of installing a newer version of the component.

In operation 710, if a new vehicle add-on is detected, the method 700 proceeds to operation 720. If no new vehicle add-on is detected, the method 700 remains at operation 710 or remains in a dormant status until the method 700 is manually turned on with an external command.

In operation 720, the new vehicle-add on is checked to verify whether the instructions for the new version exist. If yes, the method 700 proceeds to operation 730. If no, the method 700 proceeds to operation 725.

In operation 725, a determination is made as to whether the instructions for the new vehicle add-on are downloadable. For example, the new instructions may be available via a third-party source, for example, a network server, a physical media provided and attached to the vehicle, and the like. If yes, in operation 726 the new instructions are retrieved. If no, the method 700 proceeds to operation 740 (the end). Optionally, the method 700 may provide a message that the process of installing the new vehicle add-on is incomplete (operation 727).

In operation 730 (either from operation 720 directly, or indirectly through operation 726), the microcontroller or ECU is modified so that the new instructions are employed in an active manner. The installation of the new instructions facilitates the upgradeable vehicle to work with the new vehicle add-on.

After the modification in operation 730, method 700 proceed to operation 740 (the end). Optionally, a message may be provided to indicate that the installation of the new vehicle add-on was completed successfully (operation 735).

Certain of the devices shown include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 6 and 7. The disclosed devices, components, and systems contemplate using or implementing any suitable technique for performing the steps illustrated in these figures. Thus, FIGS. 6 and 7 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

We claim:

1. A system for upgrading a first component of a vehicle to a second component, comprising:

an electronic control unit (ECU) disposed in the vehicle and having a non-volatile memory, the non-volatile memory being employed to store instructions on the operation of the first component and the second component; and an upgradeable vehicle cockpit interface disposed in the vehicle and configured to load data onto the non-volatile memory, wherein the ECU is configured to detect that the first component has been replaced with the second component, wherein the second component comprises a vehicle add-on, and in response to the detection, the ECU is configured to determine whether the add-on is supported, and subsequent to the determination, the ECU is further configured to automatically instruct the upgradeable vehicle cockpit interface to rewrite the stored instructions to allow the ECU to interface with the second component, wherein rewriting the stored instructions comprises modifying the ECU to support the vehicle add-on, the first component and the second component being non-software physical hardware.

2. The system according to claim 1, wherein the first component and the second component are of a display type.

3. The system according to claim 2, wherein the first component is a dashboard display.

4. The system according to claim 3, wherein the second component is a heads-up display (HUD).

5. The system according to claim 2, wherein the first component is a heads-up display (HUD).

6. The system according to claim 5, wherein the second component is another version of heads-up display (HUD).

7. The system according to claim 1, wherein the first component is a sensory control hardware device.

8. The system according to claim 7, wherein the first component and the second component are at least one of the following:
  gesture sensor;
  touch pad;
  haptic pad;
  button knob; and
  eye tracking device.

9. The system according to claim 1, further comprising a downloadable interface to connect to a mobile communication device, wherein the downloadable interface is configured to instigate a communication with a third-party source to retrieve new instructions in response to the stored instructions not being available.

10. The system according to claim 1, wherein the ECU is separate and distinct from the first component and the second component.

11. The system according to claim 1, wherein the upgradeable vehicle cockpit interface includes a HW/FW management driver including one or more memory expansion chips for upgrading the operation of the system.

12. The system according to claim 9, wherein the communication with third party is wireless.

13. The system according to claim 9, wherein the downloadable interface is a USB device.

14. The system according to claim 1, wherein the upgradeable vehicle cockpit interface is further configured to facilitate multi-phase upgrading.

15. The system according to claim 1, wherein when the determination is that the add-on is not supported, the ECU is further configured to determine whether instructions for the new version are downloadable and to download the instructions when downloadable, wherein the modifying is based on the downloadable instructions.

16. An upgradeable vehicle, comprising:
  a first installation portion of a first component in the vehicle and a second installation portion of a second component in the vehicle, wherein the first component and the second component represent an older version and a newer version of a function associated with the upgradeable vehicle, respectively; and
  a microcontroller disposed in the vehicle with instructions for the first component and the second component,
  wherein the microcontroller is configured to detect that the second component has been installed in the vehicle, wherein the second component comprises a vehicle add-on, and
  in response to second component replacing the first component in the upgradeable vehicle, the microcontroller being configured to determine whether the add-on is supported and subsequently automatically retrieve and employ the instructions for the second component, wherein employing the instructions comprises modifying the microprocessor to support the vehicle add-on,
  the first and second component being non-software physical hardware.

17. The upgradeable vehicle according to claim 16, wherein the function is related to a display-able technology.

18. The system according to claim 16, wherein when the determination is that the add-on is not supported, the microprocessor is further configured to determine whether instructions for the new version are downloadable and to download the instructions when downloadable, wherein the employing is based on the downloadable instructions.

* * * * *